April 5, 1966 W. G. HAMM ETAL 3,243,956
FLEXIBLE SUPPORT
Filed July 15, 1963
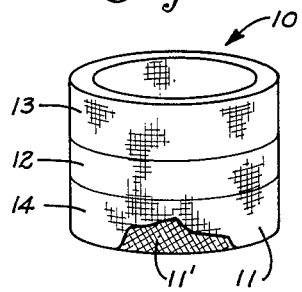
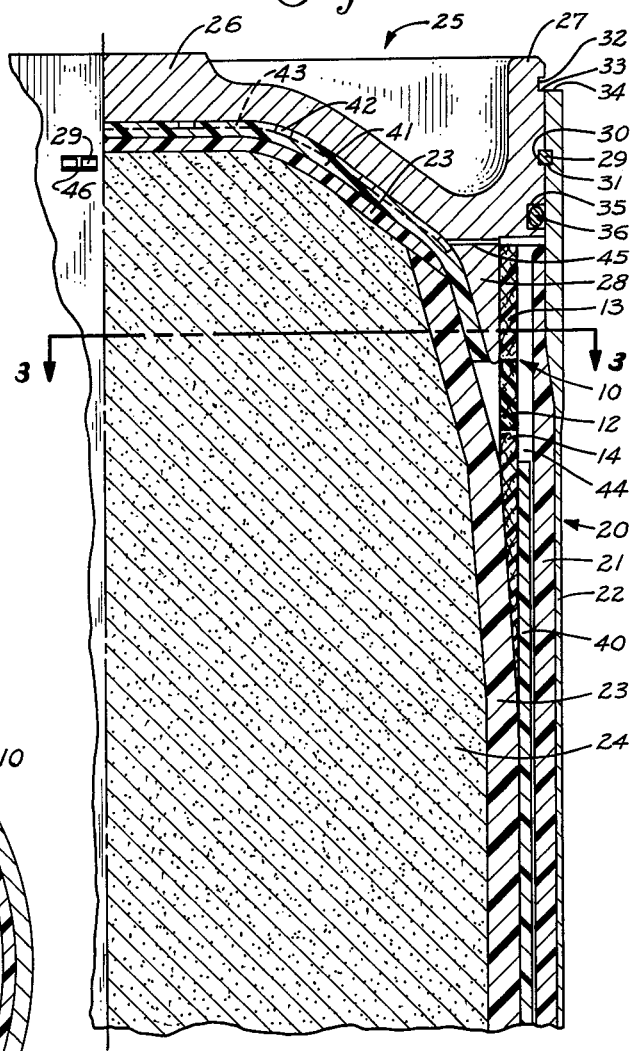
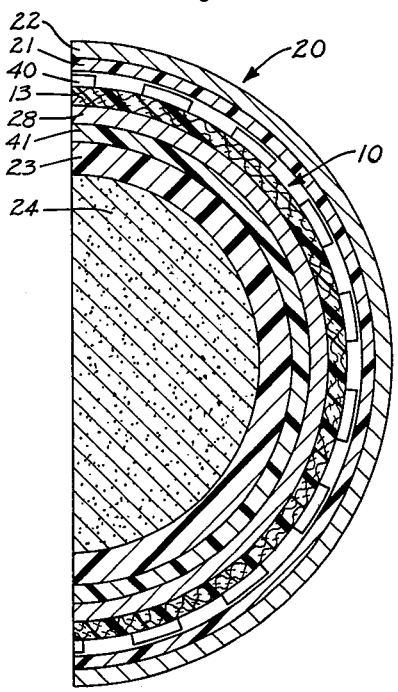
INVENTORS.
W. GERALD HAMM
M. LEE RICE
MYRON G. DEFRIES
COURTLAND N. ROBINSON United States Patent Office 3,243,956
Patented Apr. 5, 1966

3,243,956
FLEXIBLE SUPPORT
William Gerald Hamm, Fairfax, and Millard Lee Rice, Annandale, Va., Myron G. De Fries, Bethesda, Md., and Courtland N. Robinson, Washington, D.C., assignors to Atlantic Research Corporation, Fairfax County, Va., a corporation of Virginia
Filed July 15, 1963, Ser. No. 295,022
21 Claims. (Cl. 60—35.6)

This invention relates to a flexible mounting for retaining a solid propellant grain within a motor casing. More specifically, it relates to a flexible load transfer sleeve which is used to attach the solid propellant grain to the head portion of the motor casing.

Today, solid propellant rockets are used more extensively than any other type. Various kinds of solid propellant grains, for example, end burning grains and internally burning grains having different perforation configurations, are employed to supply thrust for rockets. These grains have many desirable advantages such as operational simplicity, good stability, high loading density, storageability for long periods without deterioration, low corrosiveness and toxicity, etc.

Solid propellant grains are generally designed to burn only on a preselected surface or surfaces, the others having an inhibitor coating bonded to them to restrict their burning. Generally, the grain is fixed within the motor casing by bonding the grain or the inhibitor layer to the casing or to a layer of thermal insulation which is itself bonded to the interior surface of the casing. In some cases, all the nonburning or inhibited surfaces of the grain are bonded to the casing or the insulation. In other cases, only a portion of the surface of the inhibitor layer or the grain, e.g., that located at the forward end of the grain, is bonded to the casing or the insulation. In any case, the grain is, in essence, attached directly to the motor casing by a single bond or through bonds between one or more substantially unyielding layers.

Heretofore, much difficulty has been experienced because of the rupture of one or more of the aforementioned bonds. Such difficulty is primarily caused by thermal cycling, that is, the exposure of the rocket motor to a wide range of environmental temperatures. Since the thermal coefficients of expansion of the various materials used in the grain, the motor casing and any unyielding layers bonding the two together vary considerably, the differences in the rate of expansion and contraction of these materials place a severe stress on the bonds, resulting in their eventual rupture. Depending upon the relative strength of the bonds, rupture can occur between any two surfaces, e.g., between the inhibitor layer and the motor casing or between the inhibitor layer and the propellant grain. In the first example the propellant grain is no longer adequately anchored to the motor casing and, consequently, is forced rearwardly to clog the motor nozzle or is easily fractured by set-back forces produced by rapid forward acceleration of the motor. In the second example, additional undesirable burning surfaces are created, resulting in the excessively rapid increase of combustion gases, severe overpressure and, subsequently, rupture of the motor casing or other motor malfunctions.

In addition to thermal cycling the rupture of the bonds between the surfaces of the various layers can be caused by shock or vibration during transportation of the grain and by vibrational and accelerational forces on the grain during booster operations.

Numerous means have been employed in an attempt to overcome the aforedescribed difficulties. Inhibitor coatings having coefficients of thermal expansion which closely approximate those of the grain have been employed so that the coatings will temperature cycle with the grain. This has not been entirely successful, however, at points where the grain is fixed to the motor, since the coefficients of thermal expansion of the inhibitor coating and the motor casing or the thermal insulation differ considerably. In a further attempt to remedy the rupture of the bonds, a foam rubber cushion which surrounded the grain, was bonded to the outside of the inhibitor layer and the inside of the motor casing or the thermal insulation. However, the use of such a rubber cushion creates additional problems, particularly with end burning grains used in sustainer motors. During and shortly after the ignition of the grain, the rapid generation of combustion gases creates pressure which compresses the grain. The rubber cushion which forms a seal around the grain prevents equalization of the pressure on all portions of the grain and consequently, as the aft end of the grain is compressed, it is torn from the inhibitor lining. This results in the aforementioned motor malfunctions.

Accordingly, it is an object of this invention to provide a new and improved flexible support for a solid propellant grain.

Another object of this invention is to provide a novel flexible load transfer sleeve which is used to retain a solid propellant grain within a rocket motor casing.

Other objects, advantages and features of this invention will become apparent from the following description and accompanying drawings.

In the drawings:

FIGURE 1 is a partially cut away elevational view of a preferred embodiment of the load transfer sleeve of this invention.

FIGURE 2 is a partial vertical cross-sectional view of a solid propellant grain supported within a rocket motor casing by the embodiment of the sleeve shown in FIGURE 1.

FIGURE 3 is a section taken on line 3—3 of FIGURE 2.

In accordance with our invention, we have developed a flexible load transfer sleeve for connecting a solid propellant grain to a rocket motor casing which, in general, comprises at least one, but preferably a plurality of layers of fabric, filaments or fibers. The sleeve has a median section located throughout its thickness and around its entire circumference which is impregnated with an elastic resinous material to render this section resilient and flexible. The plurality of layers are also bonded together by the resinous material in this section. The median section divides the remainder of the sleeve into a forward and aft portion each of which is impregnated with an adhesive material to bond the layers together and to bond the sleeve to the appropriate parts of the grain and the motor casing.

Generally, the forward portion of the sleeve is bonded to the forward section of the rocket motor casing. This section can be a rearward extending portion of the cylindrical body of the casing, but preferably it is integral with or attached to a detachably fixed head plate. Head plates fixed in the forward end of the rocket combustion chamber are conventional in the art and can essentially be considered a part of the motor casing. The aft portion of the sleeve is bonded to the surface of the propellant grain directly or to its inhibitor coating. If bonded directly to the grain, the aft portion can be extended rearwardly to form the inhibitor layer surrounding the grain. This mode of attachment eliminates any need for bonding the grain directly, or indirectly through inhibitor or insulator layers, to large areas of the motor casing.

The utilization of a load transfer sleeve which has a resilient, elastic median section which is not bonded to either the grain or to the motor casing provides an excellent measure of protection for the solid propellant grain against the various types of forces to which the motor casing and the enclosed grain are exposed. The resilient median section is ideally suited as a shock absorbent and load transfer median which minimizes damage to the propellant grain due to a variety of shocks or stresses placed upon the motor casing and transmitted to the enclosed grain. Consequently, a propellant grain within a rocket motor equipped with our flexible sleeve can withstand sudden jolts during transportation of the motor and axial, rotational and transverse accelerational stresses and vibrations during flight operations, which would heretofore result in damages causing malfunction of the motor.

Our flexible load transfer sleeve has sufficient strength to provide the sole attachment of the grain to the rocket motor casing. This attachment can be limited to a small area of the grain and the rearwardly extending portion of the casing. Advantageously, this limited area of attachment to both the inhibitor layer and the casing reduces thermal cycling problems to a minimum by permitting maximum differential expansion and contraction between either the solid propellant grain or the inhibitor layer and the motor casing with no danger of rupturing this attachment between them. Preferably, the same resin is used in the inhibitor and the sleeve in order that their thermal coefficients of expansion are approximately the same.

The flexible support device is particularly advantageous when employed in sustainer rocket motors having an end burning solid propellant grain. Since there is no direct bonding between the inhibitor layer and either the motor casing or the thermal insulation layer, the combustion gases produced during and immediately following the ignition of the propellant grain can flow between the two. This equalizes the pressure on all sides of the grain and eliminates the sudden increase of pressure on the aft end of the grain which heretofore compressed the grain causing its separation from the inhibitor layer.

Adverting now in detail to FIGURE 1 of the drawing, a load transfer sleeve indicated generally by the reference numeral 10 includes a plurality of layers 11 of fabric, filaments or fibers. A number of these layers are oriented such that the weave of the fabric or the individual filaments or fibers lie substantially parallel to the longitudinal axis of the solid propellant grain. Within the support sleeve these layers prevent any substantial rearward movement of the grain relative to the motor casing. Consequently, they support loads placed upon the sleeve by forces which tend to move the grain rearwardly, for example, the weight of the grain when the rocket motor is in an immobile upright position or the acceleration imparted to the motor casing during operation of a booster motor. A plurality of layers 11′, one of which is shown at the partially cut away portion of FIGURE 1, can be biased such that the weave of the fabric or the individual filaments or fibers lie at different angles to those of the axially oriented layers 11. These biased layers severely limit rotational movement of the grain relative to the motor casing caused by torsional forces imparted to the casing, and absorb or damp substantially all such relative movement between the two. The plurality of layers of the sleeve can be tailored to give the required maximum support in each individual application by varying their number, orientation, angle of bias and sequence, e.g., alternating axially aligned layers with biased layers.

The materials used to fabricate the layers of the sleeve can be selected from any which can be formed into a fabric, filament, or fiber and which are strong enough to withstand the stresses placed upon them. Illustrative of these materials are the natural or synthetic organic fibers, such as polyamide, e.g., nylon; polyacrylonitrile, e.g., orlon; polyacrylate or methylacrylate ester; polyester, such as Dacron, cellulose ester, e.g., cellulose acetate; cellulose ether, e.g., ethyl cellulose; cotton; or rayon; and inorganic filaments and fibers such as fiberglass and metals, e.g., steel. The materials used can vary from layer to layer within a single support sleeve. For example, the fibers used in the axially oriented layers can differ from those used in the biased layers. The final choice of fiber is dependent upon the compatibility with the impregnating materials, strength, etc., required for each particular application of the support sleeve.

The load transfer or support sleeve has a median section 12 which is rendered resilient and flexible by impregnating it with a resinous material which is elastic when set up or cured. Many such resinous materials, both natural and synthetic, are known to the art. Illustrative of the preferred resins are elastomers such as polysulfide rubbers, e.g., those disclosed in U.S. Patent 2,466,963 to Patrick et al.; natural rubbers, e.g., vulcanized hevea rubber; silicon and substituted silicone rubbers, e.g., fluorosilicone rubbers; butyl rubber, e.g., a copolymer of a large proportion of isobutene and a small proportion of isoprene or butadiene; butadiene-styrene copolymers, polyurethane rubbers; copolymers of ethyl acrylate and chloroethyl vinyl ether; and the like.

The resilient, flexible median section divides the remaining part of the sleeve into a forward portion 13 and an aft tapered portion 14, more clearly seen in cross-section in FIGURE 2.

The load transfer sleeve 10 of this invention can be fabricated in any convenient manner. For example, a series of alternately biased, equal length, rectangular layers 11 and 11′ of nylon cloth are laid up and temporarily held together, as by stapling, etc. The width of the sections are varied uniformly to form the tapered aft portion 14. The median section 12 is next impregnated with an elastomer such as a polysulfide rubber to render it resilient and flexible. The upper and lower portions 13 and 14 are then impregnated with an adhesive, for example, a resinous epoxy adhesive, as disclosed in a copending application, Serial No. 12,870 to De Fries et al., filed March 4, 1960, now Patent No. 3,108,433. This impregnation usually occurs immediately prior to the installation of the sleeve in a rocket motor. Any other conventional resinous adhesive such as polyester laminating resins and cellulose acetate can also be used.

The size and configuration of the flexible support can be varied depending upon such factors as the types of stress and the amount of load placed upon the support during each individual application. For example, either or both of the upper and lower portions 13 and 14 can be tapered at varying angles to conform to the shape of the structure to which they are bonded. However, in other applications neither portion need be tapered.

Turning now in detail to FIGURES 2 and 3 in which like parts are indicated by like numerals, a rocket motor 20 includes a layer of asbestos filled phenolic resin thermal insulation 21 bonded to a metal motor casing 22, an inhibitor layer 23 of an epoxy-polyamide impregnated nylon bonded to both the side and forward portions of a solid propellant grain 24, and a metal head plate 25 having a dome-shaped central portion 26, an annular outer portion 27 and an annular flange 28. The head plate 25, serving to partially enclose and contain the grain 24, may be considered to be part of the casing 22. The solid propellant grain is connected to the head plate by means of the flexible sleeve 10 whose forward portion 13 and aft tapered portion 14 are impregnated with adhesive which bonds them to the annular flange 28 and the layer of inhibitor 23, respectively. The head plate is retained at the forward end of the motor casing by means of a locking ring 29 positioned in annular grooves 30 and 31 in the head plate and motor casing, respectively. A second groove 32 in the head plate keys the two annular grooves 30 and 31 into proper alignment when its lower edge 33 is aligned with the upper edge 34 of the motor casing. Still a third groove 35 in the head plate retains an O-ring 36 which acts as a seal between the motor casing and the head plate.

A plurality of spaced, longitudinal strips 40 of cushioning material, such as a foamed silicone rubber, more clearly shown in FIGURE 3, are bonded to the outer surface of the inhibitor layer 23. A foamed silicone rubber cushion 41 having a plurality of annular grooves 42 and connecting grooves 43 is also bonded to the inhibitor layer covering the forward portion of the solid propellant grain 24. The longitudinal foamed rubber strips and the grooved foam rubber cushion restrict lateral movement and forward axial movement, respectively, of the grain relative to the motor casing 22 and absorb shocks and vibrational stresses placed on the grain during transportation, launching and flight. The cushioning material is also arranged so as to permit pressure equalization over substantially the entire surface of the grain during the ignition and burning of the noninhibited end surface (not shown) of the grain 24. As the combustion gases are produced, they will expand toward the forward portion of the rocket motor through the space between the longitudinal cushioning strips and the thermal insulation 21 and between the adjacent longitudinal strips themselves. This expansion will compress the gases in the air space 44, a plurality of spaced, radial vent ports 45 located in the base of flange 28, and the network of annular and connecting grooves in cushioning material 41, resulting in approximate pressure equalization of all portions of the grain.

Generally speaking, in addition to the aforementioned materials, the various parts of the rocket motor can be any of those well known in the art. For example, a fiberglass head plate and casing can be used, the insulation can be an asbestos-filled rubber, the inhibitor can be nylon, Dacron, fiberglass, etc., impregnated with polysulfide rubber and the cushioning material can be a shock absorbing foam such as polyurethane, etc. The solid propellant grain can be of any configuration, e.g., end burning, internally burning, etc. The propellant composition can be selected from any of those well known to the propellant art. For example, it can be a double base composition composed of nitrocellulose, an energetic plasticizer such as trimethylolethanetrinitrate or a composite propellant composed of a binder such as polyvinyl chloride, and an oxidizer such as ammonium perchlorates. Other additives which modify the physical and ballistic properties such as finely-divided metals, wires, plasticizers can also be included. Obviously the final choice of materials to be used in each of the rocket motor parts can be tailored to the requirements of each individual application.

The installation of the solid propellant grain 24 in the rocket motor 20 is readily accomplished. The grain and head plate 25 are properly aligned such that the outer surface of the cushioning material 41 on the tapered forward portion of the grain and the inner surface of the domed central portion 26 and flange 28 of the head plate mate with each other. Following impregnation of the forward and aft portions 13 and 14 with an adhesive, the sleeve 10 is wrapped around the flange and the inhibitor layer 23 of the grain and bonded to each. Either portion of the sleeve can be bonded to its respective part of the rocket motor with the adhesive material used to bond the layers of the sleeve together or with a second adhesive material which is applied to the forward and aft portions after the layers of the sleeve have been bonded. After the adhesive sets, the head plate and the attached grain are loaded into the motor casing by merely inserting them into the casing until the lower edge 33 of groove 32 is aligned with the top edge 34 of the casing. Installation is then completed by inserting the locking ring 29 through an aperture 46 in the motor casing and forcing it through the aligned circular grooves 30 and 31 with an air hammer or the like until it surrounds the head plate and both ends are visible through the aperture 46.

In addition to those already enumerated, a further outstanding and highly desirable feature of this invention innures from the use of our flexible support sleeve. It is conventional to connect the grain permanently to the motor casing through a series of adhesive bonds between the layers of material surrounding it. However, when our support sleeve is employed, the head plate and the attached grain can be easily and quickly removed from the motor casing after their complete installation. Therefore, if for some reason, for example, severe mechanical shock during transit, etc., it is desired to remove the grain, it is merely necessary to remove the locking ring and lift the head plate and attached grain from the motor casing. Both the grain and the interior of the casing can then be inspected and any damaged parts can be replaced without having to discard the whole rocket motor.

Although the flexible load transfer sleeve of this invention has been described in detail as supporting a solid propellant grain within a rocket motor casing, it is obvious that such a device has many applications outside the rocket field.

Although this invention has been described with reference to illustrative embodiments thereof, it will be apparent to those skilled in the art that the principles of this invention can be embodied in other forms but within the scope of the claims.

We claim:

1. A load transfer sleeve comprising a plurality of superimposed layers of fibrous materials, said sleeve having a forward portion, a median portion and an aft portion, said layers in said median portion being impregnated with and bonded together by an elastic resinous material to render said median portion resilient and flexible and said layers in said forward and said aft portions being impregnated with a resinous bonding composition.

2. The load transfer sleeve of claim 1 in which at least one of said portions is tapered.

3. The load transfer sleeve of claim 1 in which the fibers of at least one of said layers are biased with respect to the fibers of at least one other layer.

4. The load transfer sleeve of claim 1 in which said layers are composed of organic fibers.

5. The load transfer sleeve of claim 1 in which said layers are composed of inorganic fibrous material.

6. The load transfer sleeve of claim 4 in which said organic fibers are in the form of a woven fabric.

7. The load transfer sleeve of claim 5 in which the inorganic fibrous material is in the form of a woven fabric.

8. The load transfer sleeve of claim 6 in which the elastic resinous material is a polysulfide rubber, said fibers are nylon and the layers of said sleeve are impregnated with a resinous epoxy adhesive in their forward and aft portions.

9. In a rocket motor comprising a casing and a solid propellant grain mounted within and attached to said casing, the improvement in which said solid propellant grain is attached to said casing by bonding the load transfer sleeve of claim 1 to said casing and said grain, said forward portion being bonded to said casing and said aft portion being bonded to said grain.

10. In a rocket motor comprising a casing and a solid propellant grain mounted within and attached to said casing, said grain having an inhibitor layer bonded to at least a portion thereof, the improvement in which said solid propellant grain is attached to said casing by bonding the load transfer sleeve of claim 1 to said casing and said inhibitor layer, said forward portion being bonded to said casing and said aft portion being bonded to said inhibitor layer.

11. The rocket motor of claim 10 in which at least one of said portions is tapered.

12. The rocket motor of claim 10 in which the fibers of at least one of the layers of said sleeve are biased with respect to the fibers of at least one other layer.

13. The rocket motor of claim 10 in which the said layers of said sleeve are composed of organic fibers.

14. The rocket motor of claim 13 in which said organic fibers are in the form of a woven fabric.

15. Rocket motor of claim 14 in which the elastic resinous material is a polysulfide rubber, said fibers are nylon and the layers of said sleeve are impregnated with a resinous epoxy adhesive in their forward and aft portions.

16. The rocket motor of claim 10 in which the casing includes a head plate detachable from the remainder of the casing, the forward portion of the load transfer sleeve being bonded to said head plate.

17. The rocket motor of claim 16 in which said head plate has a circular rearward extending flange to which said forward portion is bonded.

18. The rocket motor of claim 10 in which a plurality of cushioning means are bonded to the inhibitor layer.

19. The rocket motor of claim 18 in which said cushioning means comprise a plurality of elongated strips lying parallel to the longitudinal axis of the rocket motor and a grooved section covering the forward end of the grain.

20. The load transfer sleeve of claim 1 in which the fibers of at least one of said layers are oriented parallel to the axis of said sleeve.

21. The rocket motor of claim 10 in which the fibers of at least one of said layers are oriented parallel to the axis of said sleeve.

References Cited by the Examiner
UNITED STATES PATENTS

| | | | |
|---|---|---|---|
| 2,466,963 | 4/1949 | Patrick et al. | 260—79.1 |
| 2,748,805 | 6/1956 | Winstead | 138—144 |
| 2,750,887 | 6/1956 | Marcus. | |
| 2,816,418 | 12/1957 | Loedding | 60—35.6 |
| 2,820,410 | 1/1958 | Tarr | 60—35.6 X |
| 2,835,107 | 5/1958 | Ward | 60—35.6 |
| 2,939,488 | 6/1960 | Bacon | 138—126 |
| 2,957,309 | 10/1960 | Kobbeman | 60—35.6 |
| 2,995,011 | 8/1961 | Kimmel | 60—35.6 |
| 3,026,223 | 3/1962 | Vanderbilt et al. | 138—141 |
| 3,074,585 | 1/1963 | Koontz. | |
| 3,135,297 | 6/1964 | Nordberg et al. | 60—35.6 X |

MARK NEWMAN, *Primary Examiner.*

CARLTON R. CROYLE, *Examiner.*